United States Patent
Miyazawa et al.

(10) Patent No.: US 10,870,779 B2
(45) Date of Patent: Dec. 22, 2020

(54) REMOVABLE WATER-BASED PRESSURE-SENSITIVE ADHESIVE COMPOSITION AND REMOVABLE PRESSURE-SENSITIVE ADHESIVE SHEET

(71) Applicant: SAIDEN CHEMICAL INDUSTRY CO., LTD., Tokyo (JP)

(72) Inventors: Kentaro Miyazawa, Saitama (JP); Shuji Kawamura, Saitama (JP); Hirokazu Umemiya, Saitama (JP)

(73) Assignee: SAIDEN CHEMICAL INDUSTRY CO., LTD., Tokyo (JP)

( * ) Notice: Subject to any disclaimer, the term of this patent is extended or adjusted under 35 U.S.C. 154(b) by 169 days.

(21) Appl. No.: 16/094,724

(22) PCT Filed: Nov. 6, 2017

(86) PCT No.: PCT/JP2017/039974
§ 371 (c)(1),
(2) Date: Oct. 18, 2018

(87) PCT Pub. No.: WO2018/084293
PCT Pub. Date: May 11, 2018

(65) Prior Publication Data
US 2019/0119530 A1   Apr. 25, 2019

(30) Foreign Application Priority Data
Nov. 7, 2016 (JP) .................. 2016-217062

(51) Int. Cl.
| | | |
|---|---|---|
| *C09J 7/38* | (2018.01) | |
| *C09J 133/08* | (2006.01) | |
| *C09J 133/10* | (2006.01) | |
| *C09J 11/06* | (2006.01) | |
| *C08K 5/00* | (2006.01) | |
| *C08K 5/11* | (2006.01) | |
| *C08K 5/353* | (2006.01) | |
| *C08K 5/28* | (2006.01) | |
| *C09J 11/08* | (2006.01) | |
| *C08F 220/10* | (2006.01) | |
| *C08F 220/06* | (2006.01) | |
| *C09J 133/06* | (2006.01) | |
| *C09J 133/24* | (2006.01) | |
| *C08F 220/56* | (2006.01) | |
| *C09J 133/04* | (2006.01) | |
| *C09J 133/26* | (2006.01) | |
| *C09J 133/02* | (2006.01) | |
| *C08L 33/06* | (2006.01) | |
| *C08F 220/18* | (2006.01) | |

(52) U.S. Cl.
CPC ............ *C09J 7/385* (2018.01); *C08F 220/06* (2013.01); *C08F 220/10* (2013.01); *C08F 220/56* (2013.01); *C08K 5/0025* (2013.01); *C08K 5/11* (2013.01); *C08K 5/28* (2013.01); *C08K 5/353* (2013.01); *C09J 11/06* (2013.01); *C09J 11/08* (2013.01); *C09J 133/02* (2013.01); *C09J 133/04* (2013.01); *C09J 133/06* (2013.01); *C09J 133/08* (2013.01); *C09J 133/10* (2013.01); *C09J 133/24* (2013.01); *C09J 133/26* (2013.01); *C08F 220/1808* (2020.02); *C08L 33/06* (2013.01)

(58) Field of Classification Search
CPC ...... C09J 133/06; C09J 133/24; C09J 133/04; C09J 133/26; C09J 133/02; C09J 133/08; C09J 133/10; C09J 7/385; C08F 220/56; C08F 220/1808; C08F 220/10; C08F 220/06; C08K 5/0025; C08K 5/11
See application file for complete search history.

(56) References Cited

U.S. PATENT DOCUMENTS

2012/0219795 A1   8/2012   Mitsui et al.

FOREIGN PATENT DOCUMENTS

| | | |
|---|---|---|
| JP | 04-318091 | 11/1992 |
| JP | 2001-207146 | 7/2001 |
| JP | 2011-137088 | 7/2011 |
| JP | 2012-177036 | 9/2012 |
| JP | 2014-040614 | 3/2014 |
| JP | 2014-095052 | 5/2014 |
| JP | 2015-117347 | 6/2015 |

OTHER PUBLICATIONS

International Search Report, issued in the corresponding PCT application No. PCT/JP2017/039974, dated Dec. 19, 2017, 5 pages.

*Primary Examiner* — Christopher T Schatz
(74) *Attorney, Agent, or Firm* — Hamre, Schumann, Mueller & Larson, P.C.

(57) ABSTRACT

The present application provides a re-releasable aqueous pressure-sensitive adhesive composition containing: as a main component, an emulsion [A] of a (meth)acrylic acid-based ester copolymer, an emulsion [B] of a (meth)acrylic acid-based ester copolymer, and a crosslinker [C]. The emulsion [A] contains a constituent unit that has a carboxy group or a hydroxy group and reacts with a crosslinker. The emulsion [B] is included in the composition in an amount of 0.6 parts by mass or more in terms of a solid content based on 100 parts by mass of a solid content of the emulsion [A] and functions as a crosslinking assistant. The emulsion [B] has a peculiar structure dissolving in water upon neutralization and is unmeasurable in a particle diameter distribution analysis at pH from 6.5 to 7.5. The crosslinker [C] is a hydrazide-based compound that is soluble or dispersible in water.

8 Claims, No Drawings

REMOVABLE WATER-BASED PRESSURE-SENSITIVE ADHESIVE COMPOSITION AND REMOVABLE PRESSURE-SENSITIVE ADHESIVE SHEET

TECHNICAL FIELD

The present invention relates to a re-releasable aqueous pressure-sensitive adhesive composition and a re-releasable pressure-sensitive adhesive sheet, and in detail, relates to a technique for providing: a re-releasable aqueous pressure-sensitive adhesive composition that needs no aging and that can be made into a one-pack type in a form in which a crosslinker is added in advance by containing an emulsion [A] which is a main component, an emulsion [B] functioning as a crosslinking assistant and having peculiar constitution, and a particular crosslinker [C]; and a re-releasable pressure-sensitive adhesive sheet in which a pressure-sensitive adhesive layer through the use of the re-releasable aqueous pressure-sensitive adhesive composition is formed.

BACKGROUND ART

In recent years, various studies on a pressure-sensitive adhesive for a pressure-sensitive adhesive sheet having excellent re-releasability have been made. In general, a re-releasable pressure-sensitive adhesive sheet is provided with a pressure-sensitive adhesive layer on a base material such as paper or a plastic film. With respect to pressure-sensitive adhesives to be used for forming pressure-sensitive adhesive layers, a shift has been taking place from the conventional organic solvent-based pressure-sensitive adhesives to aqueous pressure-sensitive adhesives in consideration of environmental aspects. For example, in Patent Literature 1, as a re-releasable aqueous pressure-sensitive adhesive that has excellent adhesiveness to a base material and excellent environmental friendliness, there is proposed a re-releasable aqueous pressure-sensitive adhesive containing: an acrylic-based copolymer obtained by subjecting a monomer raw material to emulsion polymerization, the monomer raw material obtained by adding a monomer having a crosslinkable reactive group to a (meth)acrylic acid alkyl ester containing an alkyl group having 2 to 12 carbon atoms; a crosslinker; and a fatty acid ester-based plasticizer. That is, by increasing the molecular weight of the acrylic-based copolymer through crosslinking with the crosslinker, the re-releasability is realized together with pressure-sensitive adhesive properties.

Moreover, in recent years, a pressure-sensitive adhesive composition having lowered viscosity has been required for the purpose of enabling high-speed application in consideration of the productivity of a pressure-sensitive adhesive sheet. On the other hand, when high-speed application is performed using an application liquid having lowered viscosity on a base material, a streak, cissing, or gathering occurs to make the face state of an applied film to be formed poor, or when a pressure-sensitive adhesive sheet is stuck to an adherend and is then released therefrom, part of a pressure-sensitive adhesive composition may adhere to the adherend or an adherend may be contaminated in some cases, so that an increase in the pressure-sensitive adhesive force with time and lowering of the re-releasability with time become problems.

Against the above-described problems, there is proposed in Patent Literature 2 a releasable pressure-sensitive adhesive composition containing: an emulsion [A] containing as a main component a constituent unit derived from a (meth) acrylic acid-based ester containing an alkyl group having 4 to 12 carbon atoms; an emulsion [B] of a (meth)acrylic acid ester copolymer, the emulsion [B] containing as a main component a constituent unit derived from a (meth)acrylic acid-based ester containing an alkyl group having 8 to 18 carbon atoms and 25 to 50% by mass of a constituent unit derived from a carboxy group-containing unsaturated monomer; and a crosslinker. It is described that by adopting the above-described constitution, an applied film having a satisfactory face state can be formed even when high-speed application is performed, and an increase in pressure-sensitive adhesive force with time relative to initial pressure-sensitive adhesive force is suppressed.

CITATION LIST

Patent Literature

Patent Literature 1: Japanese Patent Laid-Open No. 2015-117347
Patent Literature 2: Japanese Patent Laid-Open No. 2014-095052

SUMMARY OF INVENTION

Technical Problem

However, according to studies conducted by the present inventors, the epoxy-based crosslinker described as suitable in Patent Literature 2 reacts with water in the emulsions, and therefore the crosslinker has to be used in a two-pack type composition for post-addition, so that there is a problem that a one-pack type pressure-sensitive adhesive composition cannot be prepared. In addition, epoxy-based or carbodiimide-based crosslinkers are inferior in liquid stability after addition, and therefore there have been concerns over the long-term stability of a solution, such as gelation of a solution because of being short of pot life, and an increase in the viscosity of a solution with time. Further, the above-described crosslinkers need to be added at the time of use and besides, are susceptible to an influence of temperature. For example, when the air temperature is low, the progress of crosslinking is slow, or crosslinking progresses even after a coating film is formed, and therefore when the crosslinkers are used in cold regions, or used outdoors or in winter, it is difficult to exhibit stable performance, and it is necessary to make crosslinking progress until the required performance is exhibited by conducting a certain time period of aging in a predetermined temperature environment, so that there has been a problem that the crosslinkers are inferior in workability.

In contrast to those described above, a hydrazide-based crosslinker can exist stably in water, and therefore by using this, a one-pack type pressure-sensitive adhesive composition can be prepared. In addition, the hydrazide-based crosslinker makes the progress of crosslinking fast, so that there is no need to take an aging time period after a coating film is formed.

Accordingly, an object of the present invention is to provide an aqueous pressure-sensitive adhesive composition that needs no aging, that can be made into a one-pack type form which is highly convenient, and that is capable of forming a pressure-sensitive adhesive layer which has no problem in not only initial pressure-sensitive adhesive force but also in pressure-sensitive adhesive force with time, and which exhibits satisfactory re-releasability, even though the aqueous pressure-sensitive adhesive composition is a re-releasable aqueous pressure-sensitive adhesive having excellent environmentally friendliness, and further, another object of the present invention is to provide a re-releasable pressure-sensitive adhesive sheet in which the above-described pressure-sensitive adhesive layer is formed.

Solution to Problem

That is the present invention provides a re-releasable aqueous pressure-sensitive adhesive composition comprising: as a main component, an emulsion [A] of a (meth) acrylic acid-based ester copolymer, the emulsion [A] having a constituent unit that reacts with a crosslinker; an emulsion [B] of a (meth)acrylic acid-based ester copolymer, the emulsion [B] functioning as a crosslinking assistant, in an amount of 0.6 parts by mass or more in terms of a solid content based on 100 parts by mass of a solid content of the emulsion [A]; and further, a crosslinker [C] together with these emulsions, wherein:

the crosslinker [C] comprises at least a hydrazide-based compound that is soluble or dispersible in water;

the emulsion [A] of a (meth)acrylic acid-based copolymer is an emulsion comprising: as a main component, a constituent unit (a1) derived from a (meth)acrylate-based monomer; a constituent unit (a2) within a range of 0.5 to 3.0% by mass, the constituent unit (a2) derived from an unsaturated monomer containing a functional group having a carboxy group or a hydroxy group as a functional group; and a constituent unit (a3) within a range of 0.1 to 1.0% by mass, the constituent unit (a3) derived from an ethylenically unsaturated monomer and having reactivity with the hydrazide-based compound that is contained in the crosslinker [C] and that is soluble or dispersible in water;

the emulsion [B] of a (meth)acrylic acid-based ester copolymer comprises: a constituent unit (b1) derived from a (meth)acrylate-based monomer within a range of 15 to 60% by mass; a constituent unit (b2) derived from a carboxy group-containing unsaturated monomer within a range of 20 to 50% by mass; and a constituent unit (b3) within a range of 20 to 45% by mass, the constituent unit (b3) derived from an ethylenically unsaturated monomer and having reactivity with the hydrazide-based compound that is contained in the crosslinker [C] and that is soluble or dispersible in water, wherein the emulsion [B] is an emulsion that is found to be unmeasurable in a particle diameter analysis result at a pH=6.5 to 7.5 and that dissolves in water upon neutralization; and the crosslinker [C] is crosslinkable with at least the constituent unit (a3) of the emulsion [A] and the constituent unit (b3) of the emulsion [B].

The preferred embodiments according to the present invention include the followings, and the followings are preferable. The crosslinker [C] is contained within a range of 0.05 to 0.5 parts by mass based on 100 parts by mass of the solid content of the emulsion [A]; the monomer that forms the constituent unit (a3) derived therefrom and the monomer that forms the constituent unit (b3) derived therefrom each comprise at least one selected the group consisting of diacetone (meth)acrylamide, (meth)acrylamide, N-methyl (meth)acrylamide, N-ethyl(meth)acrylamide, and N,N-dimethyl(meth)acrylamide; the re-releasable pressure-sensitive adhesive composition further comprises, as the crosslinker [C], at least either one of an oxazoline-based compound or a metal chelate compound crosslinkable with the constituent unit (a2) and the constituent unit (b2), the oxazoline-based compound having within a molecule thereof two or more oxazoline groups; the re-releasable pressure-sensitive adhesive composition further comprises a non-phthalic acid-based plasticizer [D] within a range of 0.5 to 5 parts by mass based on 100 parts by mass of the solid content of the emulsion [A]; the non-phthalic acid-based plasticizer [D] comprises dibutoxyethoxyethyl adipate; and both the emulsion [A] and the emulsion [B] have an average particle diameter of 100 to 900 nm.

In addition, the present invention provides as another embodiment a re-releasable aqueous pressure-sensitive adhesive sheet comprising a pressure-sensitive adhesive layer formed on at least one face of a base material sheet, the pressure-sensitive adhesive layer comprising the re-releasable aqueous pressure-sensitive adhesive composition according to the present invention.

Advantage Effects of Invention

According to the present invention, an aqueous pressure-sensitive adhesive composition that needs no aging, that can be made into a one-pack type composition which is highly convenient, and that is capable of forming a pressure-sensitive adhesive layer which has no problem in not only initial pressure-sensitive adhesive force but also in pressure-sensitive adhesive force with time, and which exhibits satisfactory re-releasability, even though the aqueous pressure-sensitive adhesive composition is a re-releasable aqueous pressure-sensitive adhesive having excellent environmentally friendliness can be provided.

DESCRIPTION OF EMBODIMENTS

Next, the present invention will be described in more detail giving preferred embodiments for carrying out the present invention. Incidentally, in the appended CLAIMS and DESCRIPTION of the present invention, the term "(meth)acrylic" means both "acrylic" and "methacrylic", and the term "(meth)acrylate" means both "acrylate" and "methacrylate".

Aqueous Pressure-Sensitive Adhesive Composition

Against the above-described problems of the conventional techniques, the present inventors have conducted diligent studies on realization of an aqueous pressure-sensitive adhesive composition that achieves both adhesiveness to abase material and re-releasability, that needs no aging particularly even in the case where the air temperature is low, that can be made into a one-pack type, and that has never existed in the past. As a result, the present inventors have found that remarkable effects of the present invention are obtained by: using as a main component an emulsion [A] of a (meth)acrylic acid-based ester copolymer, the emulsion [A] having a constituent unit that reacts with a crosslinker; blending an emulsion [B] functioning as a crosslinking assistant and having peculiar constitution in a particular amount into the emulsion [A]; and utilizing as a crosslinker [C] a hydrazide-based compound that is soluble or dispersible in water, and have thereby reached the present invention. In more detail, it has been found that using the emulsion [B] that has constitution in which the copolymer of the emulsion [B] contains a constituent unit (b2) derived from a carboxy group-containing ethylenically unsaturated monomer within a range of 20 to 50% by mass and a constituent unit (b3) derived from an ethylenically unsaturated monomer, the constituent unit (b3) having reactivity with the crosslinker [C], within a range of 20 to 45% by mass, and that dissolves in water upon neutralization, specifically, the emulsion [B] of the peculiar copolymer, the emulsion [B] exhibiting a characteristic of being found to be unmeasurable in a particle diameter distribution analysis result at a pH=6.5 to 7.5, in a particular amount based on the emulsion [A] is effective.

That is, the re-releasable aqueous pressure-sensitive adhesive composition according to the present invention contains: as a main component, an emulsion [A] of a (meth) acrylic acid-based ester copolymer, the emulsion [A] having a constituent unit that reacts with a crosslinker; an emulsion [B] of a (meth)acrylic acid ester-based copolymer in an amount of 0.6 parts by mass or more in terms of a solid content based on 100 parts by mass of a solid content of the emulsion [A]; and together with these emulsions, a crosslinker [C] containing a hydrazide-based compound that is soluble or dispersible in water, and as a result, the remarkable effects of the present invention can be exhibited. The present inventors considers the reason that the remarkable effects of the present invention are obtained by the constitution of the present invention as follows.

First of all, the composition according to the present invention needs no aging and can be made into a one-pack type composition which is highly convenient by using as the crosslinker [C] the hydrazide-based compound that is stable in water and that makes the crosslinking speed fast, which is different from the cases where conventional epoxy-based or carbodiimide-based crosslinkers are used. Further, it is inferred that since the composition according to the present invention, as described below, uses two types of emulsions each having a different structure that forms a crosslink with the hydrazide-based compound, an aqueous pressure-sensitive adhesive composition that can realize achieving both satisfactory pressure-sensitive adhesive properties and re-releasability can be provided. The emulsion [B] the amount of use of which is smaller than the emulsion [A] which is the main component is an emulsion of a (meth)acrylic acid ester-based copolymer containing a sufficient amount of a constituent unit (b2) derived from a carboxy group-containing unsaturated monomer exhibiting hydrophilicity and a sufficient amount of a constituent unit (b3) exhibiting reactivity with the crosslinker [C], the emulsion [B] dissolving in water upon neutralization (water-solubility that makes measurement of particle diameter impossible at a pH=6.5 to 7.5). On the other hand, the emulsion [A], which is the main component, is an emulsion of a (meth)acrylic acid ester-based copolymer containing, within a structure thereof, a constituent unit (a2) derived from a functional group-containing unsaturated monomer and a constituent unit (a3) derived from an ethylenically unsaturated monomer, the constituent unit (a3) having reactivity with the crosslinker [C], each in a smaller amount than the emulsion [B].

It is considered that as a result, a network is formed through crosslinking of the constituent unit (b3) in a sufficient amount of the copolymer in the emulsion [B] with the hydrazide-based compound that constitutes the crosslinker [C] and that is soluble or dispersible in water, the copolymer of the emulsion [A] which is the main component gets into the formed network, and, in the state, the constituent unit (a3) of the copolymer of the emulsion [A] undergoes crosslinking with the crosslinker [C]. It is considered that in the composition according to the present invention, the copolymers that constitute the emulsion [A] undergo crosslinking in this way through the network formed by the crosslinker [C] and the emulsion [B] to make the molecular weight moderately high, and therefore achieving both the satisfactory pressure-sensitive adhesive properties and re-releasability can be realized even though the hydrazide-based compound that makes the crosslinking speed fast is used as the crosslinker [C]. That is, it is inferred that when a pressure-sensitive adhesive layer is formed on one face of a base material sheet by using and drying the composition according to the present invention having the above-described constitution, the stable pressure-sensitive adhesive properties at the initial stage and with time and the satisfactory re-releasability can be achieved even after rapid crosslinking by creating the state in which the copolymer of the emulsion [A] exists in the above-described network. According to studies conducted by the present inventors, the remarkable effects of the present invention are not obtained by a water-soluble copolymer, and the remarkable effects of the present invention are realized for the first time by using the emulsion [B] of the peculiar copolymer together with the other constituents, the emulsion [B] having structural characteristics specified in the present invention and dissolving in water upon neutralization. In the present invention, the action obtained by the emulsion [B] of the copolymer, having the above-described peculiar structure, is expressed by "functioning as a crosslinking assistant".

In addition, it is considered that the crosslinker [C] that constitutes the present invention is a stable hydrazide-based compound that does not undergo crosslinking in water, thereby allowing the emulsion [B], even when dissolved and dispersed in water, to exist stably without undergoing crosslinking as described above, and as a result, in the case where a one-pack type composition containing a crosslinker is prepared, the one-pack type composition can exhibit excellent performance stably over a long period of time.

In the present invention, the emulsion [A] is the main component, and the "main component" herein means that the proportion of the emulsion [A] in the re-releasable aqueous pressure-sensitive adhesive composition according to the present invention is larger than the proportion of any of the emulsion [B] and the crosslinker [C] used together with the emulsion [A]. When the proportion of the emulsion [A] is small and the emulsion [A] is not the main component, sufficient pressure-sensitive adhesion performance is not obtained. Hereinafter, individual constituents will be described.

Emulsion [A] Which is Main Component

The emulsion [A] is an emulsion of a (meth)acrylic acid-based ester copolymer constituted by containing: as a main component, a constituent unit (a1) derived from a (meth)acrylate-based monomer; a constituent unit (a2) derived from a functional group-containing unsaturated monomer within a range of 0.5 to 3.0% by mass; and a constituent unit (a3) within a range of 0.1 to 1.0% by mass, the constituent unit (a3) derived from an ethylenically unsaturated monomer having reactivity with a hydrazide-based compound that constitutes a crosslinker [C] and that is stable in water. According to studies conducted by the present inventors, in the case where the proportion of the constituent unit (a2) in the structure of the (meth)acrylic acid-based ester copolymer that constitutes the emulsion [A] is within a range of 0.5 to 3.0% by mass, and the proportion of the constituent unit (a3) is within a range of 0.1 to 1.0% by mass, the effects of using the emulsion [B] of a (meth) acrylic acid-based ester copolymer, which will be described later, together with the emulsion [A] are obtained stably. "Containing as a main component a constituent unit (a1)" as specified in the present invention means that the proportion of the constituent unit (a1) is larger than the proportion of any other constituent unit that constitutes the emulsion [A].

Constituent Unit (a1)

The constituent unit (a1) in the (meth)acrylic acid-based ester copolymer that constitutes the emulsion [A] is derived from a (meth)acrylate-based monomer. Examples of the (meth)acrylate-based monomer include the following monomers not having a functional groups. Examples include (meth)acrylate-based monomers each having an alkyl group having 1 to 18 carbon atoms, such as methyl(meth)acrylate, ethyl(meth)acrylate, n-propyl(meth)acrylate, isopropyl (meth)acrylate, n-butyl(meth)acrylate, isobutyl(meth)acrylate, tert-butyl(meth)acrylate, hexyl(meth)acrylate, 2-ethylhexyl(meth)acrylate, octyl(meth)acrylate, n-nonyl(meth)acrylate, isononyl(meth)acrylate, decyl(meth)acrylate, undecyl(meth)acrylate, dodecyl(meth)acrylate (another name: lauryl(meth)acrylate), n-amyl(meth)acrylate, isoamyl (meth)acrylate, tetradecyl(meth)acrylate, and stearyl(meth) acrylate. In addition, examples include (meth)acrylate-based monomers each having an aromatic ring or a cycloalkyl group, such as benzyl(meth)acrylate and cyclohexyl(meth) acrylate. In addition, examples include (meth)acrylate-based monomers each having an alkoxy group, such as 2-methoxyethyl acrylate and ethyl carbitol acrylate. At least one selected from the group consisting of these can be used; however, it is preferable to use 2-ethylhexyl(meth)acrylate in particular.

Constituent Unit (a2)

The constituent unit (a2) in the (meth)acrylic acid-based ester copolymer that constitutes the emulsion [A] is derived from a functional group-containing unsaturated monomer. Examples of the functional group-containing unsaturated monomer include unsaturated monomers having a functional group such as a carboxy group or a hydroxy group. Specific examples include unsaturated monomers each having a carboxy group as a functional group, such as (meth) acrylic acid, maleic acid, maleic anhydride, itaconic acid, itaconic anhydride, crotonic acid, and half esters of maleic acid or itaconic acid with an alcohol having a straight chain or a branched chain having 1 to 12 carbon atoms. In addition, specific examples include unsaturated monomers each having a hydroxy group as a functional group, such as 2-hydroxyethyl(meth)acrylate, 4-hydroxypropyl(meth)acrylate, 2-hydroxybutyl(meth)acrylate, caprolactone-modified (meth)acrylate, polyethylene glycol (meth)acrylate, and polypropylene glycol (meth)acrylate. The constituent unit (a2) that constitutes the emulsion [A] is derived from an unsaturated monomer containing at least one functional group selected from the above-described monomer groups.

Constituent Unit (a3)

The constituent unit (a3) in the (meth)acrylic acid-based ester copolymer that constitutes the emulsion [A] is derived from an ethylenically unsaturated monomer having reactivity with the hydrazide-based compound which is contained in the crosslinker [C] described later and which is soluble or dispersible in water. By having the constituent unit (a3), the (meth)acrylic acid-based ester copolymer which is the main component becomes reactive with the crosslinker [C] described later. Examples of such an ethylenically unsaturated monomer include amide group-containing monomers. Examples of the amide group-containing monomers include diacetone (meth)acrylamide, (meth)acrylamide, N-methyl (meth)acrylamide, N-ethyl(meth)acrylamide, and N,N-dimethyl(meth)acrylamide. Any constituent unit (a3) may be used as long as it is derived from at least one monomer selected from the above-described groups; however, the constituent unit (a3) is more preferably derived from diacetone (meth)acrylamide.

Polymerization Method

The emulsion [A] of a (meth)acrylic acid-based ester copolymer, the emulsion [A] having the above-described peculiar constituent units (a1) to (a3), can be synthesized through general emulsion polymerization. According to studies conducted by the present inventors, the emulsion [A] is, among others, particularly preferably synthesized through emulsion polymerization in the presence of water, an emulsifier, and a polymerization initiator with respective raw material monomers, such as a (meth)acrylate-based monomer, a functional group-containing monomer, and an ethylenically unsaturated monomer, for forming the above-described respective constituent units (a1) to (a3).

Emulsifier

The emulsifier is not particularly limited, and an anionic, nonionic, and reactive emulsifier (surfactant) can be appropriately selected and used. Specific examples of the anionic emulsifier include potassium oleate, sodium lauryl sulfate, sodium dodecylbenzenesulfonate, a sodium alkylnaphthalenesulfonate, a sodium dialkylsulfosuccinate, a sodium polyoxyethylene alkyl ether sulfate, a sodium polyoxyethylene alkyl allyl ether sulfate, a polyoxyethylene alky ether phosphoric acid ester, and a polyoxyethylene alkyl allyl ether phosphoric acid ester.

In addition, examples of the nonionic emulsifier include a polyoxyethylene alkyl ether, a polyoxyethylene alkylallyl ether, a polyoxyethylene polyoxypropylene block copolymer, a polyethylene glycol fatty acid ester, and a polyoxyethylene sorbitan fatty acid ester.

Examples of the reactive emulsifier include polyethylene glycol mono(meth)acrylates and polyoxyethylene alkyl phenol ether (meth)acrylates having various molecular weights (having a different number of moles of added EO), ammonium 2-(meth)acryloyloxy ethylene sulfonate, polyoxyethylene glycol monomaleates and derivatives thereof, and (meth)acryloyl polyoxyalkylene alkyl ether phosphates. At least one selected from the groups of the anionic, the nonionic, and the reactive emulsifiers described above can be appropriately used.

With respect to the amount of use of these emulsifiers, these emulsifiers are preferably used about 0.4 to about 10.0 parts by mass, and are more preferably used within a range of about 0.5 to about 6.0 parts by mass based on 100 parts by mass of the total amount of the raw material monomer components. According to studies conducted by the present inventors, it is preferable that the amount of use of the emulsifier be in the above-described range because thereby, the emulsion [A] of the copolymer, which constitutes the present invention, is obtained so as to have an appropriate particle diameter without producing a coagulate during emulsion polymerization, and mixability with the emulsion [B] of the copolymer, which will be described later and which constitutes the present invention, becomes good.

Polymerization Modifier

A chain transfer agent or a polymerization inhibitor can be used as a polymerization modifier in order to adjust the degree of polymerization as necessary in conducting emulsion polymerization. Examples of the chain transfer agent include n-dodecyl mercaptan, 2-mercaptoethanol, n-butyl mercaptan, trichloro mercaptan, and isopropyl alcohol. Examples of the polymerization inhibitor include hydroquinone monomethyl ether. At least one selected from these groups can be appropriately used.

Polymerization Initiator

As a polymerization initiator for use in conducting emulsion polymerization, a polymerization initiator used for usual emulsion polymerization can be appropriately used. Specific examples include: peroxides such as ammonium persulfate, potassium persulfate, sodium persulfate, hydrogen peroxide, and peroxyesters; and azobis-based polymerization initiators. Water soluble polymerization initiators selected from these groups are preferable. In addition, a reducing agent such as ferrous chloride, ferrous sulfate, sodium bisulfite, L-ascorbic acid, or sodium L-ascorbate can be used together with the previously described peroxides. The amount of use of the polymerization initiator is usually about 0.02 to 3.0 parts by mass based on 100 parts by mass of the total amount of raw material monomer components. Preferably, 0.05 to 1.0 parts by mass.

Neutralizer

In addition, the emulsion [A] obtained through polymerization may be neutralized to an appropriate pH in preparing the re-releasable aqueous pressure-sensitive adhesive composition according to the present invention. A neutralizer for use on this occasion may be any of basic organic compounds and basic inorganic compounds. Examples include: organic amines such as trimethylamine, diethanolamine, triethanolamine, and 2-aminomethylpropanol; alkali metal hydroxides such as sodium hydroxide and potassium hydroxide; and ammonia, and other publicly known neutralizers can also be used. Incidentally, these neutralizers can also be used during emulsion polymerization reaction for obtaining an emulsion.

Physical Properties

In the emulsion [A] of a (meth)acrylic acid-based ester copolymer, which is obtained in the manner as described above and which constitutes the present invention, the glass transition temperature (hereinafter, referred to as Tg) of the copolymer is preferably −50° C. or less. More preferably, −55° C. or less. When the Tg of the (meth)acrylic acid-based ester copolymer exceeds −50° C., striking a balance between the pressure-sensitive adhesive force and the re-releasability may be difficult in some cases. Incidentally, the Tg of the copolymer in the present invention is determined from a calculation formula using Tg values of respective homopolymers described in Japan Emulsion Industry Association Standard "Method of representing hardness of film of synthetic resin emulsion (107-1996)" (Nihon Emulsion Kogyokai Kikaku, "Goseijushi emulsion no himaku no katasa hyoujihouhou (107-1996)" in Japanese).

The emulsion [A] of a (meth)acrylic acid-based ester copolymer, which constitutes the present invention, preferably has an acid value of 16 mgKOH/g or less. More preferably, 8 mgKOH/g or less. By setting the proportion of the above-described constituent unit (a2) to 0.5 to 3.0% by mass, the (meth)acrylic acid-based ester copolymer having an acid value of 16 mgKOH/g or less can be easily obtained. When the acid value exceeds 16 mgKOH/g, the adhesiveness to a base material may become poor in some cases.

In addition, the emulsion [A] that constitutes the present invention in preparing the re-releasable aqueous pressure-sensitive adhesive composition according to the present invention preferably has a pH of about 8 to about 9. In addition, the emulsion [A] preferably has an average particle diameter of about 100 to about 900 nm, more preferably 150 to 350 nm. In addition, the emulsion [A] preferably has a viscosity at 25° C. of 200 mPa·s or less, more preferably 100 mPa·s or less. According to studies conducted by the present inventors, it is preferable that the physical property values of the emulsion [A] satisfy those described above because the emulsion [A] becomes more excellent in the compatibility with the emulsion [B] used together with the emulsion [A]. Incidentally, the average particle diameter is measured by a laser light scattering system particle size distribution measurement apparatus.

Emulsion B of (Meth)Acrylic Acid-Based Ester Copolymer

The re-releasable aqueous pressure-sensitive adhesive composition according to the present invention contains the above-described emulsion [A] as a main component and an emulsion [B] of a (meth)acrylic acid-based ester copolymer, the emulsion [B] functioning as a crosslinking assistant, in an amount of 0.6 parts by mass or more in terms of a solid content based on 100 parts by mass of a solid content of the emulsion [A]. As previously described, the remarkable effects of the present invention are achieved for the first time by the peculiar structure in the copolymer that constitutes this emulsion [B].

The emulsion [B] that constitutes the present invention is an emulsion of a (meth)acrylic acid-based ester copolymer that is constituted by containing: a constituent unit (b1) derived from a (meth)acrylate-based monomer within a range of 15 to 60% by mass; a constituent unit (b2) derived from a carboxy group-containing unsaturated monomer within a range of 20 to 50% by mass; and a constituent unit (b3) derived from an ethylenically unsaturated monomer having reactivity with a crosslinker [C], which will be described later, within a range of 20 to 45% by mass. The emulsion [B] that constitutes the present invention is characterized in that it is an emulsion that is found to be unmeasurable in a particle diameter distribution analysis result at a pH=6.5 to 7.5, that is, an emulsion the particle diameter of which cannot be recognized, the emulsion dissolving in water upon neutralization. The emulsion [B] that characterizes the present invention in this way is an emulsion of a water-soluble type (meth)acrylic acid-based ester copolymer having a high acid value and containing a large amount of a reactive group having reactivity with the crosslinker [C]. As described previously, the emulsion [B] that constitutes the present invention is a copolymer containing the above-described constituent units each in a particular amount and therefore functions as a crosslinking assistant. Therefore, the composition according to the present invention enables providing a pressure-sensitive adhesive composition: in which a hydrazide-based compound that is stable in water and that makes crosslinking speed fast can be used as the crosslinker [C]; from which a solution that is stable over a long period of time even though such a crosslinker is contained is obtained as a one-pack type liquid; which needs no aging after a coating film is formed; which has excellent pressure-sensitive adhesive properties at an initial stage and with time; and which exhibits satisfactory re-releasability by using, together with the previously described emulsion [A], the emulsion [B] functioning as a crosslinking assistant for the copolymer that constitutes the emulsion [A]. Hereinafter, respective constituents will be described.

Constituent Unit b1

The constituent unit (b1) in the (meth)acrylic acid-based ester copolymer that constitutes the emulsion [B] is derived from a (meth)acrylate-based monomer. As the (meth)acrylate-based monomer, any of those previously described in the constituent unit (a1) of the copolymer in the emulsion [A] can be used. Therefore, description is omitted.

The proportion of the constituent unit (b1) in the copolymer that constitutes the emulsion [B] is set within a range of 15 to 60% by mass for the purpose of obtaining sufficient pressure-sensitive adhesion performance and re-releasability. More preferably, 15 to 40% by mass.

Constituent Unit (b2)

The constituent unit (b2) in the (meth)acrylic acid-based ester copolymer that constitutes the emulsion [B] is derived from a carboxy group-containing unsaturated monomer. Examples of the carboxy group-containing unsaturated monomer include (meth)acrylic acid, maleic acid, maleic anhydride, itaconic acid, itaconic anhydride, crotonic acid, and half esters of maleic acid or itaconic acid with an alcohol having a straight chain or a branched chain having 1 to 12 carbon atoms, and any of these can be used.

The proportion of the constituent unit (b2) is within a range of 20 to 50% by mass, and the amount is relatively large. As described previously, the reason that the remarkable effects of the present invention are obtained is that the (b2) is constituted in the manner as described above. Unless the proportion of the constituent unit (b2) is within the above-described range, the emulsion polymerization reaction becomes difficult to conduct, and the requirement of "that is found to be unmeasurable in a particle diameter distribution analysis result at a pH=6.5 to 7.5", as specified in the present invention, namely, the requirement of "an emulsion that dissolves in water upon neutralization", which means the solubility to water in such an extent that the particle diameter of the emulsion [B], when neutralized, cannot be measured, cannot be satisfied. More preferably, 30 to 45% by mass.

Constituent Unit (b3)

The constituent unit (b3) in the (meth)acrylic acid-based ester copolymer that constitutes the emulsion [B] is derived from an ethylenically unsaturated monomer having reactivity with the crosslinker [C] containing a hydrazide-based compound that is soluble or dispersible in water. As the ethylenically unsaturated monomer for use in the formation of the constituent unit (b3), those previously described in the constituent unit (a3) of the copolymer of the emulsion [A] can be used similarly. Therefore, description is omitted.

The important thing for obtaining the remarkable effects of the present invention is in that the proportion of the constituent unit (b2) in the copolymer that constitutes the emulsion [B] is set within a range of 20 to 50% by mass, as specified in the present invention, and in addition, that the proportion of the constituent unit (b3) in the copolymer of the emulsion [B] is set within a range of 20 to 45% by mass, preferably within a range of 30 to 40% by mass. According to studies conducted by the present inventors, as described previously, a network is formed by the crosslinker [C] and the copolymer of the emulsion [B] by constituting the emulsion [B] as described above, and the copolymer that constitutes the emulsion [A] exists so as to get into the network and undergoes crosslinking to increase the molecular weight, and therefore the pressure-sensitive adhesive layer formed exhibits sufficient pressure-sensitive adhesive properties at an initial stage and with time and has excellent re-releasability.

Additional Constituent Unit

The (meth)acrylic acid-based ester copolymer for which it is essential to have the above-described constituent units of (b1) to (b3), which constitute the emulsion [B] as described above, may further contain as a constituent unit thereof a constituent unit derived from a multi-functional acrylate such as trimethylolpropane triacrylate which is a crosslinkable monomer. The amount of use thereof is not particularly limited as long as the amount is within a range of expected purposes of the present invention; however, the amount is preferably within a range of 0.1 to 3.0 parts by mass, more preferably 0.5 to 2.0 parts by mass based on 100 parts by mass of the total amount of the above-described constituent units of (b1) to (b3).

Polymerization Method

The emulsion [B] of the (meth)acrylic acid-based ester copolymer, containing the above-described constituent units (b1) to (b3) and functioning as a crosslinking assistant, can be synthesized through general emulsion polymerization in the same manner with the emulsion [A]. The method is the same as the method previously described in the emulsion [A], and therefore description is omitted. In addition, with respect to emulsifiers, polymerization initiators, and neutralizers that can be used, the same as those previously described in the emulsion [A] can also be used, and therefore description is omitted.

Physical Properties

The emulsion [B] of a (meth)acrylic acid-based ester copolymer, which has peculiar constitution and which brings about the remarkable effects of the present invention through the use thereof, is found to be unmeasurable in a particle diameter distribution analysis result at a pH=6.5 to 7.5 and dissolves in water upon neutralization from the structural characteristics. That is, the (meth)acrylic acid-based ester copolymer that constitutes the emulsion [B] has, as described previously, the constitution that contains a large amount of a carboxy group as the constituent unit (b2) and therefore exhibits a characteristic of changing from a clouded emulsion state into a transparent solution-like state by dissolving in water upon neutralization that makes the pH about 6.5 to about 7.5. Therefore, the particle diameter distribution cannot be measured even though attempts to measure it are made. Incidentally, in the particle diameter analysis, measurement is conducted with a laser light scattering system particle size distribution measurement apparatus in the same manner as in the measurement of the average particle diameter.

The Tg of the (meth)acrylic acid-based ester copolymer that constitutes the emulsion [B] is preferably 10 to 130° C. It is not preferable that the Tg of the (meth)acrylic acid-based ester copolymer exceeds 130° C. because the ratio of water-soluble monomers is excessively high and the stability of emulsification may become poor in some cases, and on the other hand, when the Tg is lower than 10° C., the copolymer may become hard to dissolve in water in some cases.

The pH of the emulsion [B] that is obtained in the manner as described above and that constitutes the present invention is about 3 to about 6. The average particle diameter measured in this state is preferably about 100 to about 900 nm, more preferably about 130 nm to about 200 nm, which is the same with the emulsion [A]. In addition, the emulsion [B] preferably has a viscosity at 25° C. of 50 mPa·s or less, more preferably 10 mPa·s or less. When the physical property values of the emulsion [B] satisfy those described above, the emulsion [B] becomes more excellent in the previously described compatibility with the emulsion [A].

Amount of Use

The above-described emulsion [B] functions, as described previously, as a crosslinking assistant, and according to studies conducted by the present inventors, needs to be contained in an amount of 0.6 parts by mass or more in terms of a solid content based on 100 parts by mass of the solid content of the emulsion [A] in order to obtain the effects thereof. Incidentally, the upper limit of the amount of use of the emulsion [B] needs not to be particularly specified in the present invention as long as the amount of use of the emulsion [B] is within the range of the present invention; however, about 0.6 to about 2.0 parts by mass is sufficient. When the amount of use becomes excessively large, there is a tendency that the viscosity of the resultant aqueous pressure-sensitive adhesive composition becomes excessively high to make coating difficult.

Crosslinker C

The re-releasable aqueous pressure-sensitive adhesive composition according to the present invention contains an emulsion [B] that characterizes the present invention together with the previously described emulsion [A] which is the main component and further contains as a crosslinker [C] a hydrazide-based compound that is crosslinkable with the constituent unit (a3) of the emulsion [A] and the constituent unit (b3) of the emulsion [B] and that is soluble or dispersible in water. As described previously, by constituting the re-releasable aqueous pressure-sensitive adhesive composition according to the present invention in this way, the remarkable effects of the present invention are obtained. Hereinafter, description is made on the crosslinker [C].

As described above, the crosslinker [C] needs to contain a hydrazide-based compound that is soluble or dispersible in water. As described previously, epoxy-based or carbodiimide-based crosslinkers (hardeners) have been conventionally used for re-releasable pressure-sensitive adhesive compositions. In addition, as described previously, for example, an epoxy-based crosslinker reacts with water or a carboxy group in an emulsion, and therefore the crosslinker has to be added later, so that the epoxy-based crosslinker has not been able to be made into a one-pack type pressure-sensitive adhesive composition. In addition, the epoxy-based or carbodiimide-based crosslinkers, when used, are inferior in liquid stability accompanying the progress of crosslinking after addition thereof and make the progress of crosslinking slow, so that there has been a need to take an aging time period after a coating film is formed. In addition, there is also a problem that aging is susceptible to an influence of temperature, and therefore an environment in which aging is performed also has to be taken into consideration. On the other hand, the hydrazide-based crosslinker has advantages that it can be made into a one-pack type pressure-sensitive adhesive composition because it can exist stably in water and that there is no need to take an aging time period after a coating film is formed because it makes the progress of crosslinking fast in forming the coating film. However, there has been a problem that it is difficult to adjust the molecular weight of a polymer after crosslinking because the crosslinking speed is fast.

Against this problem, in the present invention, the emulsion [B] is used together with the hydrazide-based compound used as the crosslinker [C] and the emulsion [A] which is the main component, and the copolymer that constitutes this emulsion [B] is made to have a peculiar structure containing a constituent unit (b2) derived from a carboxy group-containing unsaturated monomer and a constituent unit (b3) having reactivity with the hydrazide-based compound which is the crosslinker [C] each in a high proportion. As a result, as described previously, the copolymer that constitutes the emulsion [B] and the hydrazide-based compound which is the crosslinker [C] undergo crosslinking to form a network, thereby enabling appropriate suppression of crosslinking between the copolymers that constitute the emulsion [A] even though the hydrazide-based crosslinker that makes the progress of crosslinking fast is used. In this way, by using the hydrazide-based crosslinker and the emulsion [B] functioning as a crosslinking assistant together with the crosslinker, the re-releasable aqueous pressure-sensitive adhesive composition according to the present invention gives an excellent effect of re-releasability and can be made into a one-pack type pressure-sensitive adhesive composition that is obtained by adding a crosslinker to an emulsion at the time of blending and that is highly convenient.

As the hydrazide compound, conventionally known hydrazide-based compounds can be used as long as they are used within the range of the present invention. Specifically, for example, adipic acid dihydrazide, sebacic acid dihydrazide, dodecane dihydrazide, isophthalic acid dihydrazide, and the like can be used. Among them, adipic acid dihydrazide that easily reacts with diacetone (meth)acrylamide that is suitable as the (a3) or (b3) specified in the present invention is preferable. Such a crosslinker [C] is preferably contained within a range of 0.05 to 0.5 parts by mass, more preferably within a range of 0.1 to 0.3 parts by mass based on 100 parts by mass of the solid content of the emulsion [A].

In addition, the cross linker that constitutes the present invention can further contain, in addition to the above-described hydrazide-based compound, at least either one of an oxazoline-based compound having, within a molecule thereof, two or more oxazoline groups, or a metal chelate compound crosslinkable with the constituent unit (a2) of the emulsion [A] and the constituent unit (b2) of the emulsion [B] as long as they are contained within a range of expected purposes of the present invention. These compounds have reactivity with the constituent unit derived from a carboxy group-containing unsaturated monomer, and since the hydrazide-based compound that is essential in the present invention has reactivity with the constituent unit of each emulsion, the constituent unit derived from an ethylenically unsaturated monomer, a pressure-sensitive adhesive composition that has more excellent crosslinkability and re-releasability can be prepared by using these together. As the amount of use of the above-described compounds, they are preferably used within a range of, for example, 0.05 to 2.0 parts by mass based on 100 parts by mass of the solid content of the emulsion [A].

Non-Phthalic Acid-Based Plasticizer [D]

The re-releasable aqueous pressure-sensitive adhesive composition according to the present invention can further contain a non-phthalic acid-based plasticizer [D] within a range of 0.5 to 5 parts by mass based on 100 parts by mass of the solid content of the emulsion [A]. Examples of the plasticizer include: fatty acid esters such as oleic acid esters, adipic acid esters, succinic acid esters, maleic acid esters, fumaric acid esters, and citric acid esters; and benzoic acid esters such as dipropylene glycol dibenzoate and triethylene glycol dibenzoate. These plasticizers can be used singly or in a combination of two or more thereof, and further, other publicly known plasticizers can also be used. Particularly, among the above-described plasticizers, dibutoxyethoxyethyl adipate is preferable.

Additional Component

The re-releasable aqueous pressure-sensitive adhesive composition according to the present invention can further use a wetting agent. The wetting agent has an action of making the surface of a base material easily wet. Examples thereof include Newcol 291M (manufactured by NIPPON NYUKAZAI CO., LTD., sodium dialkyl sulfosuccinate: solid content of 70%) which is an anionic surfactant. The amount of use thereof is preferably about 0.4 to about 1.0 part by mass based on 100 parts by mass of the solid content of the emulsion [A].

The re-releasable aqueous pressure-sensitive adhesive composition according to the present invention contains: an emulsion [A] of a (meth)acrylic acid-based ester copolymer, the emulsion [A] being a main component and having a constituent unit that reacts with a hydrazide-based compound which is a crosslinker; and an emulsion [B] of a (meth)acrylic acid-based ester copolymer having a high acid value and containing a large amount of a reactive group that reacts with the hydrazide-based compound, and uses the hydrazide-based compound that can stably exist in water as a crosslinker [C]. Therefore, the re-releasable aqueous pressure-sensitive adhesive composition according to the present invention can be made into a one-pack type composition in which there is no need to mix a crosslinker (hardener) immediately before coating, and in addition, uses the hydrazide-based compound, therefore does not need to take an aging time period and needs no aging, and can contribute to time savings during production and to management cost reduction.

Re-Releasable Pressure-Sensitive Adhesive Sheet

The re-releasable pressure-sensitive adhesive sheet according to the present invention includes a pressure-sensitive adhesive layer formed at least one face of a base material, the pressure-sensitive adhesive layer containing the above-described re-releasable aqueous pressure-sensitive composition according to the present invention. As described previously, the re-releasable aqueous pressure-sensitive adhesive composition according to the present invention can be made into a one-pack type composition and needs no aging after a coating film is formed, and therefore a pressure-sensitive adhesive layer having excellent pressure-sensitive adhesive properties and re-releasability can be easily obtained. In addition, the re-releasable pressure-sensitive adhesive sheet according to the present invention has excellent pressure-sensitive adhesive force at an initial stage and with time and has excellent re-releasability as well.

Examples of the base material sheet include, but not particularly limited to: a film made of any one of resins selected from the group consisting of polyester resins, polypropylene resins, polyethylene resins, polystyrene resins, polyamide resins, polyacetate resins, polyvinyl chloride resins, acrylic resins, polycarbonate resins, and polyethylene terephthalate resins; synthetic paper produced from a polyolefin-based resin or the like; a metal deposited body; paper base materials such as wood free paper, coated paper, glassine paper, and heat-sensitive paper; and laminated paper obtained by laminating a thermosetting resin such as polyethylene on these paper base materials. There is no problem if processing such as release treatment or embossing is performed on one face of these base material sheets. It is appropriate that the thickness of the base material sheet is 10 to 100 μm.

The re-releasable pressure-sensitive adhesive sheet according to the present invention can be obtained by a method in which coating is performed using an application apparatus that is usually used, such as, for example, a roll application apparatus, drying is then performed, and if necessary, performing crosslinking by heating, or other methods. In the case where the re-releasable pressure-sensitive adhesive sheet according to the present invention is produced, the amount of application of the re-releasable aqueous pressure-sensitive adhesive composition according to the present invention is preferably, for example, about 10 to about 50 μm.

EXAMPLES

Next, the present invention will be described in more specifically giving Synthesis Examples, Examples, and Comparative Examples with respect to constituent materials used. Incidentally, "parts" or "%" described below is on amass basis.

Synthesis Example 1: Production Example of Emulsion [A]

A monomer mixture was prepared by weighing and mixing 99.0 parts of 2-ethylhexyl acrylate (2EHA), which is a monomer for forming the constituent unit (a1) derived therefrom, 0.7 parts of acrylic acid (AAc), which is a monomer for forming the constituent unit (a2) derived therefrom, and 0.3 parts of diacetone acrylamide (DAAM), which is a monomer for forming the constituent unit (b3) derived therefrom. Subsequently, with 100 parts of the mixture, 2 parts of a sodium polyoxyethylene alkyl ether sulfate (trade name: LATEMUL E-118B, manufactured by Kao Corporation), 2 parts of a polyoxyethylene polycyclic-phenyl ether sulfate salt (trade name: Newcol 707SF, manufactured by NIPPON NYUKAZAI CO., LTD.), 0.5 parts of a polyoxyethylene lauryl ether phosphate (trade name: PLYSURF A-208B, manufactured by DKS Co., Ltd.) each as an anionic emulsifier, and 51 parts of ion-exchanged water were mixed to emulsify the resultant mixture, thereby preparing an emulsified product of the monomer mixture.

Next, into a reaction apparatus equipped with a thermometer, a stirrer, a dropping apparatus, a refluxing-and-cooling pipe, and a nitrogen-introducing pipe, 34 parts of ion-exchanged water and 0.04 parts of a polyoxyethylene polycyclic-phenyl ether sulfate salt (trade name: Newcol 707SF, manufactured by NPPON NYUKAZAI CO., LTD.) were weighed, nitrogen was sealed, and the internal temperature was raised to 60° C. While the temperature was kept thereat, 1 part of an ammonium persulfate aqueous solution having a concentration of 10% and 1 part of an anhydrous sodium bisulfite aqueous solution having a concentration of 10% were added thereto, and immediately after that, the emulsified product of the monomer mixture, which was previously prepared, was dropped therein continuously for 3 hours to conduct emulsion polymerization. In addition, in parallel with this, 2 parts of an ammonium persulfate aqueous solution having a concentration of 5% and 3 parts of an anhydrous sodium bisulfite aqueous solution having a concentration of 5% were dropped therein. After the dropping was completed, the resultant mixture was subjected to aging at 80° C. for 3 hours, then cooled to room temperature, and thereafter neutralized by adding ammonia water. Thereafter, the concentration was adjusted by adding ion-exchanged water to obtain an emulsion (A-1) of an acrylic acid ester copolymer, the emulsion (A-1) having a solid content of 51.9%. The obtained emulsion A-1 had a pH of 8.7, an average particle diameter of 350 nm, and a viscosity of 70 mPa·s/25° C.

Synthesis Examples 2 to 6: Production Examples of Emulsion [B]

As monomers, methacrylic acid (MAAc), which is a monomer for forming the constituent unit (b2) derived therefrom, ethyl acrylate (EA), which is a monomer for forming the constituent unit (b1) derived therefrom, diacetone acrylamide (DAAM), which is a monomer for forming the constituent unit (b3) derived therefrom, and as a crosslinkable monomer, trimethylolpropane triacrylate (TMP), which is a multifunctional acrylate, were used, weighed, and mixed according to combinations each shown in Table 1 to prepare each monomer mixture. Subsequently, with 100 parts of the mixture, 3.5 parts of a sodium polyoxyethylene alkyl ether sulfate (trade name: LATEMUL E-118B, manufactured by Kao Corporation), 3 parts of a polyoxyethylene polycyclic-phenyl ether sulfate salt (trade name: Newcol 707SF, manufactured by NIPPON NYUKAZAI CO., LTD.) each as an anionic emulsifier, and 200 parts of ion-exchanged water were mixed to emulsify the resultant mixture, thereby preparing an emulsified product of the monomer mixture.

Next, into a reaction apparatus equipped with a thermometer, a stirrer, a dropping apparatus, a refluxing-and-cooling pipe, and a nitrogen-introducing pipe, 130 parts of ion-exchanged water and 0.15 parts of a polyoxyethylene polycyclic-phenyl ether sulfate salt (trade name: Newcol 707SF, manufactured by NPPON NYUKAZAI CO., LTD.) were weighed, nitrogen was sealed, and the internal temperature was raised to 80° C. While the temperature was kept thereat, 1.0 part of an ammonium persulfate aqueous solution having a concentration of 5% was added thereto, and immediately after that, the emulsified product of the monomer mixture, which was previously prepared, was dropped therein continuously for 2 hours to conduct emulsion polymerization. In addition, in parallel with this, 2 parts of an ammonium persulfate aqueous solution having a concentration of 5% was dropped therein. After the dropping was completed, the resultant mixture was subjected to aging at 80° C. for 2 hours, then cooled to room temperature, and thereafter the concentration was adjusted by adding ion-exchanged water, thereby obtaining solutions of emulsions (B-1 to B-5) of acrylic acid ester copolymers, the solutions each having a solid content of about 25%.

In Table 1, the characteristics of each emulsion [B] obtained are shown. As shown in Table 1, the emulsions B-1 to B-3 each have combination that satisfies the constituent elements specified in the present invention. The emulsion B-4 and the emulsion B-5 do not satisfy the constituent elements specified in the present invention. Specifically, in the emulsion B-4, the amount of DAAM, which is a monomer for forming the constituent unit (b3) derived therefrom of the emulsion [B], has a value larger than that specified in the present invention, and in addition, the emulsion B-5 is an emulsion synthesized without using DAAM.

TABLE 1

Compositions and physical properties of emulsion [B]

| | Emulsion [B] | Monomer components (parts) | | | | Solid content (% by mass) | Viscosity (mPa · s/25° C.) | pH | Average particle diameter (nm) |
| | | MAAc (b2) | EA (b1) | DAAM (b3) | TMP | | | | |
|---|---|---|---|---|---|---|---|---|---|
| Synthesis Example 2 | B-1 | 40.0 | 40.0 | 20.0 | 1.0 | 25.1 | 7 | 4.7 | 138 |
| Synthesis Example 3 | B-2 | 40.0 | 30.0 | 30.0 | 1.0 | 25.0 | 6 | 4.9 | 148 |
| Synthesis Example 4 | B-3 | 35.0 | 25.0 | 40.0 | 1.0 | 25.0 | 5 | 5.8 | 153 |
| Synthesis Example 5 | B-4 | 35.0 | 15.0 | 50.0 | 1.0 | 25.0 | 5 | 5.8 | 166 |
| Synthesis Example 6 | B-5 | 35.0 | 65.0 | — | 1.0 | 25.0 | 5 | 3.4 | 170 |

MAAc: Methacrylic acid
EA: Ethyl acrylate
DAAM: Diacetone acrylamide
TMP: Trimethylolpropane triacrylate

Example 1

As the emulsion [A], 100 parts (in terms of solid content) of A-1, as the emulsion [B], 0.75 parts (in terms of solid content) of B-1, and as the crosslinker [C], 0.3 parts (in terms of solid content) of adipic acid dihydrazide (ADH) were blended, and further, as a wetting agent, 0.4 parts (in terms of solid content) of Newcol 291M (trade name, manufactured by NIPPON NYUKAZAI CO., LTD., sodium dialkyl sulfosuccinate: solid content of 70%), which is an anionic surfactant, was mixed based on 100 parts (in terms of solid content) of A-1. Subsequently, a re-releasable aqueous pressure-sensitive adhesive composition having a solid content of 46.0%, a viscosity of 3800 mPa·s (B type viscometer), and a pH of 8.5 was prepared through adjustment with water.

Examples 2 to 7 and Comparative Examples 1 to 8

The emulsion [A], the emulsion [B], the crosslinker [C], and the plasticizer [D] were blended according to the type and the amount blended (in terms of solid content ratio), which were shown in Table 2-1 and Table 2-2, and further, as a wetting agent, 0.4 parts (in terms of solid content) of Newcol 291M (manufactured by NIPPON NYUKAZAI CO., LTD., sodium dialkyl sulfosuccinate: solid content of 70%), which is an anionic surfactant, was mixed based on 100 parts (in terms of solid content) of the emulsion [A]. Subsequently, aqueous pressure-sensitive adhesive compositions each having a solid content of 46.0% were prepared through adjustment with water.

Evaluation

A sample for evaluation was prepared using each of the above-obtained aqueous pressure-sensitive adhesive compositions of Examples and Comparative Examples, and the pressure-sensitive adhesive force, the holding power, and the re-releasability were measured and evaluated as follows.

Preparation of Pressure-Sensitive Adhesive Sheet for Evaluation

Each aqueous pressure-sensitive adhesive composition prepared in Examples and Comparative Examples was applied on a releasable sheet so that the thickness after drying was 17 μm, and the applied composition was dried at 100° C. for 90 seconds and was then transferred to commercially available heat-sensitive paper to be left standing in an atmosphere of 23° C. and 50% RH for 1 day, thereby obtaining a pressure-sensitive adhesive sheet for evaluation.

1. Initial Pressure-Sensitive Adhesive Force/Pressure-sensitive Adhesive Force with Time Measurement was conducted for the pressure-sensitive sheets for evaluation in accordance with the measurement of 180° peeling and pressure-sensitive adhesive force in JIS Z-0237. Specifically, a pressure-sensitive adhesive sheet for re-release was cut into 25 mm in width and was stuck to a stainless steel (SUS) sheet, a polyethylene (PE) sheet, and K liner paper (base paper used for the front and back of corrugated board sheet) to be press-bonded by a back-and-force movement of a 2-kg roller. Initial pressure-sensitive adhesive force was measured by peeling the pressure-sensitive adhesive sheet at a peeling speed of 300 mm/min immediately after press-bonding with the above-described roller. In addition, the pressure-sensitive adhesive force with time was measured in such a way that the pressure-sensitive adhesive sheet was left standing at 23° C. and 50% RH (relative humidity) for 24 hours after press-bonding with the roller and was then peeled at a peeling speed of 300 mm/min. Obtained results are shown in Table 2-1 and Table 2-2.

2. Holding Power

In accordance with JIS Z-0273, a test piece obtained by cutting a pressure-sensitive adhesive sheet for evaluation into 25 mm in width by 50 mm in length was stuck to a SUS304 sheet, which had been polished and cleaned, so that the adhesion area was 25 mm×25 mm, and was press-bonded through a back and forth movement of a 2-kg roller. Thereafter, the press-bonded test piece was left standing at 23° C. and 50% RH for 30 minutes, and a load of 1 kg was then applied in an atmosphere of 40° C. to measure the time (number of seconds) until the test piece fell down. That is, it is indicated that the larger the number of seconds is, the more excellent holding power a test piece has. Obtained results are shown in Table 2-1 and Table 2-2.

3. Re-Releasability

A pressure-sensitive sheet for evaluation was cut into 25 mm in width and was stuck to a stainless steel (SUS) sheet, a polyethylene (PE) sheet, and K liner paper, and the stuck pressure-sensitive sheet was left standing in an atmosphere of 23° C. and 50% RH for 7 days. Thereafter, the pressure-sensitive sheet was peeled in a direction of 120° at a speed of 5 m/min by hand, and the state of peeling was observed visually to be evaluated according to the following criteria. Good and Fair are rated as allowable, and Poor was rated as not allowable. Obtained results are shown in Table 2-1 and Table 2-2.

Evaluation Criteria

Good: can be peeled completely without a glue residue or paper tearing

Fair: at a level having no problem in practical use although glue residue or residues, and paper tearing are observed to some extent Poor: not allowable in practical use because a lot of glue residues and paper tearing are observed

4. Initial Viscosity/Viscosity with Time

The initial viscosity was measured with a BM type viscometer (manufactured by TOKYO KEIKI INC.) at No. 4, 60 rpm, and 25° C. using re-releasable aqueous pressure-sensitive adhesive compositions prepared in Examples and Comparative Examples. In addition, the viscosity with time was measured under the same conditions after the compositions were left standing for 7 days and for 14 days. Obtained results are shown in Table 2-1 and Table 2-2.

TABLE 2-1

Compositions and evaluation results of Examples

|  |  | Example 1 | Example 2 | Example 3 | Example 4 | Example 5 | Example 6 | Example 7 |
|---|---|---|---|---|---|---|---|---|
| Emulsion [A] | A-1 | 100.0 | 100.0 | 100.0 | 100.0 | 100.0 | 100.0 | 100.0 |
| Emulsion [B] | B-1 | 0.75 | 1.00 |  |  | 0.75 |  |  |
|  | B-2 |  |  | 0.75 |  |  |  |  |
|  | B-3 |  |  |  | 0.75 |  | 0.75 | 1.00 |
| Crosslinker [C] | ADH | 0.30 | 0.30 | 0.30 | 0.30 | 0.30 | 0.30 | 0.45 |
|  | EPOCROS WS-700 |  |  |  |  | 0.60 |  |  |
| Plasticizer [D] | SR-86A |  |  |  |  |  | 1.50 |  |
| Viscosity (mPa·s/25° C.) |  | 3800 | 3950 | 3700 | 4000 | 3850 | 3950 | 4100 |
| Viscosity with time [40° C. × 7 days] (mPa·s/25° C.) |  | 3800 | 3900 | 3800 | 4050 | 3850 | 3900 | 4100 |
| Viscosity with time [40° C. × 14 days] (mPa·s/25° C.) |  | 3650 | 4000 | 3750 | 3900 | 3750 | 3900 | 4000 |
| Initial pressure-sensitive adhesive force (N/25 mm) | Stainless steel sheet | 6.0 | 5.7 | 5.3 | 5.5 | 5.5 | 4.5 | 5.0 |
|  | Polyethylene sheet | 4.9 | 4.5 | 4.2 | 4.5 | 4.8 | 4.1 | 4.0 |
|  | K liner paper | 5.9 | 5.4 | 5.2 | 5.0 | 5.8 | 4.8 | 4.7 |
| Pressure-sensitive adhesive force with time (N/25 mm) | Stainless steel sheet | 7.1 | 6.8 | 6.2 | 5.9 | 6.3 | 4.9 | 5.3 |
|  | Polyethylene sheet | 5.7 | 5.3 | 4.8 | 4.7 | 5.3 | 4.5 | 4.2 |
|  | K liner paper | 6.5 | 6.0 | 5.5 | 5.5 | 6.5 | 5.2 | 5.0 |
| Re-releasability (23° C. 50% RH × 7 days) | Stainless steel sheet | Good | Good | Good | Good | Good | Good | Fair |
|  | Polyethylene sheet | Good | Good | Good | Good | Good | Good | Good |
|  | K liner paper | Good | Good | Good | Good | Good | Good | Good |
| 40° C. Holding power (sec) |  | 42000 | >60000 | >60000 | >60000 | 57000 | >60000 | >60000 |

Emulsion [A], Emulsion [B], and Emulsion [C] are each expressed in terms of solid content (unit: part)
ADH: Adipic acid dihydrazide
EPOCROS WS-700 (trade name, manufactured by NIPPON SHOKUBAI CO., LTD.): Oxazoline-based crosslinker
SR-86A (trade name, manufactured by TAOKA CHEMICAL COMPANY, LIMITED): Dibutoxyethoxyethyl adipate

TABLE 2-2

Compositions and evaluation results of Comparative Examples

|  |  | Comparative Example | | | | | | | |
|---|---|---|---|---|---|---|---|---|---|
|  |  | 1 | 2 | 3 | 4 | 5 | 6 | 7 | 8 |
| Emulsion [A] | A-1 | 100.0 | 100.0 | 100.0 | 100.0 | 100.0 | 100.0 | 100.0 | 100.0 |
| Emulsion [B] | B-1 | 0.25 | 0.50 |  |  |  |  |  |  |
|  | B-2 |  |  | 0.50 |  |  |  |  |  |
|  | B-3 |  |  |  | 0.50 |  |  |  |  |
|  | B-4 |  |  |  |  | 0.50 | 0.75 |  |  |
|  | B-5 |  |  |  |  |  |  | 0.75 | 0.75 |
| Crosslinker [C] | ADH | 0.30 | 0.30 | 0.30 | 0.30 | 0.30 | 0.30 |  |  |
|  | Denacol EX-421 |  |  |  |  |  |  | 1.20 |  |
|  | CARBODILITE V-04 |  |  |  |  |  |  |  | 2.00 |
| Viscosity (mPa·s/25° C.) |  | 4000 | 3800 | 3750 | 3700 | 3900 | 4050 | 3350 | 3100 |
| Viscosity with time [40° C. × 7 days] (mPa·s/25° C.) |  | 4100 | 3800 | 3850 | 3650 | 3900 | 4000 | Gelation | 5800 |
| Viscosity with time [40° C. × 14 days] (mPa·s/25° C.) |  | 4050 | 3700 | 3800 | 3750 | 4000 | 3900 | Gelation | 6800 |
| Initial pressure-sensitive adhesive force (N/25 mm) | Stainless steel sheet | 7.3 | 6.2 | 5.8 | 5.8 | 5.8 | 5.2 | 5.4 | 5.8 |
|  | Polyethylene sheet | 6.1 | 5.3 | 4.7 | 4.9 | 4.9 | 4.1 | 4.8 | 4.3 |
|  | K liner paper | 7.9 | 7.0 | 6.5 | 6.7 | 6.3 | 5.5 | 5.8 | 5.6 |
| Pressure-sensitive adhesive force with time (N/25 mm) | Stainless steel sheet | 8.8 | 7.5 | 7.1 | 6.6 | 6.2 | 5.5 | 7.4 | 6.8 |
|  | Polyethylene sheet | 6.2 | 6.4 | 6.2 | 5.7 | 5.5 | 4.3 | 5.7 | 5.5 |
|  | K liner paper | 10.5 | 9.2 | 8.0 | 7.8 | 7.3 | 6.1 | 6.6 | 5.7 |

TABLE 2-2-continued

Compositions and evaluation results of Comparative Examples

| | | Comparative Example | | | | | | | |
|---|---|---|---|---|---|---|---|---|---|
| | | 1 | 2 | 3 | 4 | 5 | 6 | 7 | 8 |
| Re-releasability (23° C. 50% RH × 7 days) | Stainless steel sheet | Poor | Poor | Fair | Fair | Poor | Poor | Good | Good |
| | Polyethylene sheet | Poor | Poor | Fair | Good | Fair | Poor | Good | Good |
| | K liner paper | Poor | Poor | Poor | Poor | Poor | Poor | Good | Good |
| 40° C. Holding power (sec) | | 10000 | 30000 | 40000 | 42000 | 50000 | >60000 | 12000 | 24000 |

Emulsion [A], Emulsion [B], and Emulsion [C] are each expressed in terms of solid content (unit: part)
ADH: Adipic acid dihydrazide
Denacol EX-421 (trade name, manufactured by Nagase Chemtex Corporation): Epoxy-based crosslinker
CARBODILITE V-04 (tradename, manufactured by Nisshinbo Chemical Inc.): Polycarbodiimide-based crosslinker As shown in Table 2-1, in the compositions of Examples that satisfy the requirements specified in the present invention, stable pressure-sensitive adhesive force was exhibited at the initial stage and with time without causing an increase in viscosity with time, and further, in the pressure sensitive adhesive sheets for evaluation, in which the pressure-sensitive adhesive layers were formed with the compositions, it was confirmed that excellent results were exhibited in both the re-releasability and the holding power. On the other hand, as shown in Table 2-2, with respect to the compositions of Comparative Examples 1 to 3 in which the amount of use of the emulsion [B] does not satisfy the requirements specified in the present invention, in the pressure-sensitive adhesive sheets for evaluation, in which the pressure-sensitive adhesive layers were formed with the compositions, the re-releasability and the holding power were less sufficient than the cases of Examples, and with respect to the composition of Comparative Example 4, in the pressure-sensitive adhesive sheet, in which the pressure-sensitive adhesive layer was formed with the composition, the re-releasability was insufficient and was not enough in practical use. It is considered that this is because in any of the compositions of Comparative Examples 1 to 4, the amount of the emulsion [B] that functions as a crosslinker is deficient, and therefore the crosslinks between the crosslinker [C] and the constituent unit (b3) of the emulsion [B] were deficient, so that sufficient networks were not formed, and thus in the pressure-sensitive adhesive sheets, sufficient re-releasability and holding power were not able to be obtained. In addition, in the compositions of Comparative Examples 5 and 6 in which the constitution is such that the proportion of the constituent unit (b3) in the emulsion [B] is larger than the proportion specified in the present invention, the re-releasability in the formed pressure-sensitive adhesive layers was insufficient. It is considered that the reason for this is that in the compositions of Comparative Examples 5 and 6, the proportion of the constituent unit (b3) in the emulsion [B] was excessively large, and therefore the crosslink density between the constituent unit (b3) and the crosslinker [C] became excessively high to make the whole film coat hard, so that the adhesiveness with the base material was insufficient, and thus the re-releasability was not able to be obtained. In addition, in Comparative Example 7 and Comparative Example 8 in which the copolymer that constitutes the emulsion [B] does not contain the constituent unit (b3), and a hydrazide-based compound is not used as the crosslinker [C], but epoxy-based or carbodiimide-based crosslinker is used, namely a conventional product is used, the re-releasability is good, but the viscosity of the solution was increased more with time or gelation occurred more, and the holding power was worse than those in the cases of Examples.

The invention claimed is:

1. A re-releasable aqueous pressure-sensitive adhesive composition comprising: as a main component, an emulsion [A] of a first (meth)acrylic acid-based ester copolymer, the emulsion [A] having a constituent unit that reacts with a crosslinker [C]; an emulsion [B] of a second (meth)acrylic acid-based ester copolymer, in an amount of 0.6 parts by mass or more in terms of a solid content based on 100 parts by mass of a solid content of the emulsion [A], wherein the emulsion [B] functions as a crosslinking assistant; and further, the crosslinker [C] together with the emulsion [A] and the emulsion [B], wherein the crosslinker [C] comprises a hydrazide-based compound that is soluble or dispersible in water, the emulsion [A] of the first (meth)acrylic acid-based copolymer comprises: as a main component, a constituent unit (a1) derived from a first (meth)acrylate-based monomer; a constituent unit (a2) in an amount of 0.5 to 3.0% by mass, the constituent unit (a2) being derived from a first unsaturated monomer containing a functional group, wherein the first unsaturated monomer is at least one monomer selected from a group consisting of an unsaturated monomer having a carboxyl group and an unsaturated monomer having a hydroxy group; and a constituent unit (a3) in an amount of 0.1 to 1.0% by mass, wherein the constituent unit (a3) is derived from a first ethylenically unsaturated monomer and has reactivity with the hydrazide-based compound that is contained in the crosslinker [C] and that is soluble or dispersible in water, the emulsion [B] of the second (meth)acrylic acid-based ester copolymer comprises: a constituent unit (b1) derived from a second (meth)acrylate-based monomer in an amount of 15 to 60% by mass; a constituent unit (b2) derived from a second unsaturated monomer having a carboxy group in an amount of 20 to 50% by mass; and a constituent unit (b3) in an amount of 20 to 45% by mass, wherein the constituent unit (b3) is derived from a second ethylenically unsaturated monomer and has reactivity with the hydrazide-based compound that is contained in the crosslinker [C] and that is soluble or dispersible in water, the emulsion [B] is an emulsion that dissolves in water upon neutralization and is unmeasurable in a particle diameter analysis at a pH in a range from 6.5 to 7.5 and the crosslinker [C] is crosslinkable with at least the constituent unit (a3) of the emulsion [A] and the constituent unit (b3) of the emulsion [B].

2. The re-releasable aqueous pressure-sensitive adhesive composition according to claim 1, wherein the crosslinker

[C] is contained in the composition in an amount of 0.05 to 0.5 parts by mass based on 100 parts by mass of the solid content of the emulsion [A].

3. The re-releasable aqueous pressure-sensitive adhesive composition according to claim 1, wherein each of the first ethylenically unsaturated monomer that forms the constituent unit (a3) derived therefrom and the second ethylenically unsaturated monomer that forms the constituent unit (b3) derived therefrom comprises at least one compound selected the group consisting of diacetone (meth)acrylamide, (meth) acrylamide, N-methyl(meth)acrylamide, N-ethyl(meth) acrylamide, and N,N-dimethyl(meth)acrylamide.

4. The re-releasable aqueous pressure-sensitive adhesive composition according to claim 1, further comprising a crosslinker [C'] crosslinkable with the constituent unit (a2) and the constituent unit (b2),
wherein the crosslinker [C'] is at least one compound selected from the group consisting of an oxazoline-based compound and a metal chelate compound, the oxazoline-based compound having within a molecule thereof, two or more oxazoline groups.

5. The re-releasable aqueous pressure-sensitive adhesive composition according to claim 1, further comprising a non-phthalic acid-based plasticizer [D] in an amount of 0.5 to 5 parts by mass based on 100 parts by mass of the solid content of the emulsion [A].

6. The re-releasable aqueous pressure-sensitive adhesive composition according to claim 5, wherein the non-phthalic acid-based plasticizer [D] comprises dibutoxyethoxyethyl adipate.

7. The re-releasable aqueous pressure-sensitive adhesive composition according to claim 1, wherein both the emulsion [A] and the emulsion [B] have an average particle diameter in a range from 100 to 900 nm.

8. A re-releasable pressure-sensitive adhesive sheet comprising: a pressure-sensitive adhesive layer; and a base material sheet, wherein the pressure-sensitive adhesive layer is formed on at least one face of the base material sheet, and the pressure-sensitive adhesive layer comprising the re-releasable aqueous pressure-sensitive adhesive composition of claim 1.

* * * * *